United States Patent Office 3,546,278
Patented Dec. 8, 1970

3,546,278
PREPARATION OF UNSATURATED ESTERS
Percy Hayden and Donald Wright, Norton-on-Tees, England, assignors to Imperial Chemical Industries Limited, London, England, a corporation of Great Britain
No Drawing. Filed June 16, 1967, Ser. No. 646,490
Claims priority, application Great Britain, July 6, 1966, 30,287/66
Int. Cl. C07c 67/04
U.S. Cl. 260—497                    13 Claims

ABSTRACT OF THE DISCLOSURE

Unsaturated organic compounds such as alpha-olefines, particularly ethylene and propylene, are oxidised to aldehydes or ketones, unsaturated esters, or unsaturated ethers in the presence of water, carboxylic acids, or alcohols or phenols respectively, the oxidation being catalysed by a palladium compound and an ionisable cyanate. By use of a redox system and molecular oxygen to maintain the palladium compound in its oxidised state a continuous process may be obtained. The process may be carried out in an essentially halide-free medium without loss of reaction rate. The process is of particular use in the production of vinyl acetate from ethylene.

The present invention relates to the oxidation of unsaturated organic compounds.

In the following British patent specifications we have disclosed processes for the oxidation of unsaturated organic compounds using palladium compounds as catalysts. In such processes it is preferred to have a redox system such as a copper salt and molecular oxygen present.

Thus in British patent specification No. 964,001 we describe and claim the production of carboxylic esters of unsaturated alcohols by contacting an alpha-olefin with a palladium salt, either under substantially anhydrous conditions or in the presence of a minor amount of water as defined, and in the presence of a carboxylic acid, carboxylate ions, a redox system and molecular oxygen.

In British patent specification No. 1,101,055 we describe a process in which allyl acetate is produced by contacting propylene with a palladium salt in the presence of acetic acid, the acetate of an alkali metal or of an alkaline earth metal or of copper and molecular oxygen and a copper salt, either under anhydrous conditions or in the presence of a quantity of water not exceeding 20% based on the total weight of acetic acid and water, and in the absence of halide ions in concentrations greater than 0.2 molar, the concentration of the acetate being at least 0.2 molar.

In British patent specification No. 1,101,056 we describe and claim a process whereby certain unsaturated compounds are oxidised in the presence of a palladium salt, an aliphatic carboxylic acid containing between 2 and 10 carbon atoms and a salt of copper or iron (a redox system). Up to 20% water, and chloride or bromide ions may be present. Allyl acetate is exemplified as a suitable starting material in which case the oxidised products comprise acrolein, acrylic acid and allylidene diacetate.

In British patent specification No. 987,278 we disclose a process for the production of esters which comprises the step of reacting a compound having the structure $R.CH=CH.CH(R^1)X$ in which R is hydrogen or alkyl, $R^1$ is hydrogen or alkyl and X is chloride or acyloxy, at a temperature not exceeding 200° C. with a solution containing a carboxylic acid, a palladous salt, a cupric salt, a metal halide other than a fluoride, and less than 25% by weight of water. When $R.CH=CH(R^1)X$ is allyl acetate, acetate esters of glycerol may be produced.

In British patent specification No. 1,027,396 we describe a process which comprises the step of contacting an olefinic hydrocarbon at a partial pressure of at most 10 atmospheres with a solution containing a carboxylic acid, an ionised carboxylate and a palladous salt, to produce an ester containing a product corresponding to the acid used having a total content of mono-esters and di-esters of glycols of at least 30 molar percent based on the total amount of organic compounds produced, the reaction being carried out in the presence of a redox system, molecular oxygen, less than 15% by weight of water and an alkali metal halide so that, assuming complete ionisation, the halide:palladous gram ion ratio is greater than 6:1 and the halide:carboxylate gram ion ratio is at least 6:10.

We have now found that processes in which an unsaturated organic compound is oxidised using a palladium catalyst are advantageously carried out in the presence of an ionisable cyanate.

According to the present invention a process for the oxidation of an unsaturated organic compound comprises contacting the unsaturated compound with a nucleophilic compound HA in the presence of a salt or co-ordination compound of palladium and an ionisable cyanate.

In the nucleophilic compound HA, H is hydrogen and A a nucleophilic element or group. Useful nucleophilic compounds are water, aliphatic and aromatic alcohols, e.g. methanol, isobutanol, lauryl alcohol and benzyl alcohol and phenols. Preferred nucleophilic compounds are carboxylic acids, particularly aliphatic or aromatic mono- or di-carboxylic acids. Examples of aliphatic monocarboxylic acids useful in the process are those containing up to 20 carbon atoms, particularly up to 12 carbon atoms, for example acetic acid, propionic acid and n-hexanoic acid. Adipic acid is a suitable aliphatic di-carboxylic acid and benzoic acid and the phthalic acids, especially terephthalic acid, are suitable aromatic mono- and di-carboxylic acids respectively.

It is often preferred when using a carboxylic acid to include carboxylate ions in the reaction medium additional to any derived from self-ionisation of the carboxylic acid. The carboxylate ions may be derived from any carboxylic acid, for example from an aliphatic or aromatic mono- or di-carboxylic acid. They are preferably derived from one of the acids mentioned in the preceding paragraph and more preferably are the same as the carboxylic acid used. The preferred concentration of carboxylate ions is generally in the range 0.5 to 4 molar although in the process described in British patent specifications Nos. 987,278 and 1,027,396 lower concentrations of carboxylate ions e.g. 0.5 to 1.0 molar may be used. The carboxylate ions may be introduced to the process in the form of an alkali metal or alkaline earth metal carboxylate, lithium and sodium carboxylates being particularly suitable, or may be formed in situ by reaction of an alkali metal or alkaline earth metal carbonate with the carboxylic cid.

When using a carboxylic acid in the process it is preferred that the water concentration in the reaction medium is less than 25% by weight. More preferably the water concentration is less than 10% by weight or even lower e.g. less than 5% by weight. The process may generally however be operated satisfactorily when the water concentration lies in the range 5 to 15% by weight.

The unsaturated organic compound may be an olefinic or aromatic compound. Thus benzene compounds may be oxidised by the process of the present invention and when acetic acid for example is the nucleophilic compound phenyl acetate and benzyl acetate may be obtained from benzene and toluene respectively.

Particularly useful olefinic compounds in the present process are alpha-olefines (i.e. olefines containing the grouping —CH=CH$_2$). The alpha-olefine may be an aliphatic alpha-olefine containing up to 20 carbon atoms or more, e.g. cracked wax alpha-olefines from a C$_{14}$ cut, or an aryl substituted alpha-olefine, e.g. styrene. Preferably the aliphatic alpha-olefine contains at most 12 carbon atoms, e.g. n-hexene-1, n-octene-1, or 3:5:5-trimethyl hexene-1; more preferably at most 4 carbon atoms, e.g. ethylene, propylene, n-butene-1 or isobutene. Non-terminal olefines containing 4 to 8 or more carbon atoms, such as n-octene-2, may also be used in the process as may diolefines such as butadiene and substituted butadienes, for example piperylene. Other important olefinic compounds include olenific acids, alcohols e.g. allyl alcohol, and esters; for example allyl acetate which by choice of reaction conditions as described in British patent specifications Nos. 987,278 and 1,027,396 can be oxidised to glyceryl esters or to acrolein respectively by the present process. The use of an alpha-olefine together with a carboxylic acid gives rise to unsaturated esters in the present process, e.g. acetic acid and ethylene or propylene give vinyl acetate or allyl acetate respectively. When an alpha-olefine is used with water, aldehydes or ketones are formed, e.g. ethylene gives acetaldehyde and propylene acetone. If the nucleophilic compound is an alcohol however vinyl ethers and acetals are obtained e.g. methanol and ethylene give methyl vinyl ether and di-methyl acetal. The concentration of the olefinic compound in the solution is preferably up to 5 molar. When the olefinic compound is gaseous, for example ethylene, this concentration may be achieved by the use of partial pressures of the olefinic compounds up to 200 atmospheres, although pressures in the range 2 to 60 atmospheres are preferred.

The salt or co-ordination compound of palladium for use in the process is preferably a palladous salt e.g. a palladous halide such as palladous chloride or palladous bromide. Palladous carboxylates e.g. palladous acetate are also suitable particularly when the nucleophilic compound is a carboxylic acid when the palladous carboxylate may correspond to the carboxylic acid or carboxylate ions used. Other palladous salts which may be used include lithium chloropalladite. The co-ordination compounds of palladium which may be used in the process include dichlorobis(benzonitrile) palladium II. The palladium salt may also be formed in situ by the use of metallic palladium. The concentration of the salt of co-ordination compound of palladium is preferably up to 0.1 molar more preferably in the range $10^{-5}$ to $10^{-2}$ molar.

By ionisable cyanate we mean a cyanate which under the reaction conditions is capable of giving rise to cyanate ions (cyanate in the present specification is also intended to include isocyanate). Without being limited by theory we believe however, that in the reaction medium a substantial part, if not all, of the cyanate radicals are bound in complexes with for example the copper or palladium. Preferred ionisable cyanates are the alkali metal or alkaline earth metal cyanates although cyanic acid may also be used. Most preferred for use in the present process are sodium, potassium or lithium cyanate. Other ionisable cyanates which may be used in the process are those in which the cyanate forms part of a complex compound, particularly a complex compound which contains cations or anions which are stipulated or desirable components of the reaction medium, e.g. palladium or copper. Such a complex is a cupricyanate such as potassium cupricyanate. The concentration of the ionisable cyanate is preferably in the range 0.0001 to 1.0 molar, particularly in the range 0.001 to 0.1 molar.

It is greatly preferred to carry out the process of the present invention in the presence of a redox system which may be organic or inorganic in nature. For example, it is preferred to use an organic redox system, para-benzoquinone, duroquinone and 2-ethylanthraquinone are suitable. If, on the other hand, it is preferred to use an inorganic redox system, copper salts are particularly suitable. For example, copper chloride or copper carboxylates, e.g. copper acetate, may be employed. Thus, in the production of an unsaturated acetate or of acrolein from allyl acetate, copper acetate may be used as the redox system. Other inorganic redox systems such as ferric salts, for example ferric chloride, may be used. It is also possible to employ organic and inorganic redox systems in conjunction; for example one of the quinones named above and a copper salt may be used conjointly. As yet another possibility, two organic or inorganic redox systems may be used together, for example a copper salt and a ferric salt. In particular the use of certain other inorganic redox systems in conjunction with a copper redox system is particularly applicable, for example a cobalt salt and a copper salt. The redox system is preferably used in a concentration of at least 0.01 and preferably at least 0.1 molar.

The redox system is preferably employed in the presence of molecular oxygen which serves to re-oxidise the reduced form of the redox system. The re-oxidation may be carried out in situ or as a separate stage in a two stage process. The oxygen pressure may be up to 10 atmospheres and is preferably in excess of 0.1 atmosphere. It is also preferred when using a gaseous unsaturated compound and introducing this compound to the reaction medium in admixture with oxygen that the concentration of oxygen is below that at which the mixture is inflammable. Thus when the unsaturated compound is ethylene this concentration is 3 to 7% by volume. For gaseous unsaturated compounds such as ethylene and propylene the rate of introduction of such a gas mixture to the solution may conveniently be 100 to 3000 litres per litre of solution per hour, preferably about 1600 litres per litre of solution per hour.

The oxidation of unsaturated compounds by palladium salts as illustrated by the processes described in the specifications referred to above is often dependent for efficient operation on the presence of halide ions. Disadvantages attendant on the use of halide ions however is their corrosive effect on ferrous metals, especially on stainless steel, and the production of chlorinated organic by-products. One of the advantages of the use of an ionisable cyanate is that the concentration of halide ions may be reduced or halide ions omitted altogether without losing the advantages conferred by halide ions such as high reaction rate.

Low halide concentration processes are particularly important for the type of process described in British patent specifications Nos. 964,001, 1,101,055 and 1,101,056 and especially those in which an alpha-olefine such as ethylene or propylene is reacted with a carboxylic acid such as acetic acid, or allyl acetate is converted to acrolein. By low halide concentration we mean halide ion concentrations of less than 0.05 gram ions per litre of solution, preferably less than 0.01 gram ions per litre of solution. In particular to reduce the corrosive effect to a minimum it is preferred to work at halide ion concentrations of at most 0.0003 gram ions per litre of solution or, where possible, in the absence of halide. Chloride or bromide ions are the halide ions normally encountered in processes such as are described in British patent specifications Nos. 964,001, 1,101,055 and 1,101,056 and it is chloride ions which are particularly deleterious.

The process of the present invention may advantageously be carried out in the temperature range 50° to 200° C. preferably 100° to 130° C.

When the nucleophilic compound is a carboxylic acid the process may be carried out using an excess of the carboxylic acid as solvent, or an additional organic polar solvent may be used. Suitable solvents include amides such as acetamide and benzamide; substituted amides such as N,N-dimethylformamide, N-methyl acetamide and N,N-dimethylacetamide; nitriles such as acetonitrile and benzonitrile; sulphoxides such as the dialkyl sulphoxides, especially dimethyl sulphoxide; and sulphones such as sulpholane and the substituted sulpholanes. Aromatic and aliphatic nitro compounds which are known solvents may also be used, e.g. nitrobenzene or the nitroparaffins. An ester corresponding in the acid radical to the ester being produced may also be used (for example, when an unsaturated acetate is being produced, an acetate ester such as 1,1-diacetoxyethane or 1,2-diacetoxyethane may be used as solvent). The solvent may conveniently form 5–95% by weight of the reaction medium.

In one preferred form of the invention a gaseous olefine, for example ethylene or propylene, admixed with molecular oxygen is introduced into a solution of palladous acetate, an alkali metal acetate, copper acetate and an alkali metal cyanate in acetic acid. The pressure is in the range 5 to 100 atmospheres and the temperature in the range 100° to 130° C. The halide ion concentration of the solution is less than 0.05 gram ions per litre of solution and the water concentration 5 to 15% by weight of the solution. The unsaturated ester products of the reaction for example vinyl or allyl acetate are removed in the exit gas stream.

The products of the process are useful as chemical intermediates and, in the case of the unsaturated esters produced when the nucleophilic compound is a carboxylic acid, as polymerisable monomers.

The invention will now be further described with reference to the following examples.

EXAMPLE 1

A gas mixture containing 66.5% propylene and 33.5% oxygen was continuously introduced into a solution comprising:

| | |
|---|---|
| Acetic acid | 95 mls. |
| Palladous acetate | 0.05 mole/litre. |
| Potassium cyanate | 0.05 mole/litre. |
| Copper acetate | 0.2 mole litre. |
| Lithium acetate | 2.0 moles/litre. |
| Water | Approx. 1 ml. |

The pressure was 1 atmosphere, the temperature 90° C., the gas rate 15 litres/hour and the duration of the reaction 3 hours.

The products of the process were removed in the exit gas stream and measured chromatographically.

The rate of formation of the products of the reaction was as follows:

| | Mole/litre/hour |
|---|---|
| Allyl acetate | 0.15 |
| Acetone | 0.03 |
| Isopropenyl acetate | 0.03 |
| Acrolein | 0.01 |

EXAMPLE 2

A gas mixture containing 95% ethylene and 5% oxygen was continuously introduced into a solution comprising:

| | |
|---|---|
| Acetic acid | 1000 mls. |
| Palladous acetate | 0.001 molar (added during the course of the experiment). |
| Potassium cyanate | 0.004 molar (added during the course of the experiment). |
| Copper acetate | 0.2 molar. |
| Lithium acetate | 2.0 molar. |
| Water | 50 mls. |

The pressure was 400 p.s.i.g., the temperature 125° C., the gas rate 1600 litres/hour and the duration of the experiment 24 hours.

The products of the process were removed in the exit gas stream and measured chromatographically.

The rates of formation of the products of the process were:

| | Mole/litre/hour |
|---|---|
| Vinyl acetate | 1.4 |
| Acetaldehyde | 0.4 |

We claim:
1. In a process for the oxidation of an olefinic hydrocarbon containing up to 20 carbon atoms which comprises reacting said olefinic hydrocarbon with a hydrocarbon aliphatic carboxylic acid containing up to 20 carbon atoms or a hydrocarbon aromatic carboxylic acid in the presence of a salt or co-ordination compound of palladium, the improvement which consists in carrying out the oxidation in the presence of an ionizable cyanate selected from the group consisting of alkali metal and alkaline earth metal cyanates, cyanic acid and cupricyanates.

2. The process of claim 1 in which the palladium salt is a palladous halide or palladous carboxylate.

3. The process of claim 1 in which the acid is a hydrocarbon aliphatic or aromatic mono- or di-carboxylic acid.

4. The process of claim 3 in which the halide ion concentration is less than 0.05 gram ions per litre of solution.

5. The process of claim 4 in which a mixture comprising an alpha-olefinic hydrocarbon containing at most four carbon atoms and molecular oxygen is passed into a solution of palladous acetate, an alkali or alkaline earth metal acetate, copper acetate and an alkali metal cyanate in acetic acid, the water content of the solution being less than 25% by weight.

6. The process of claim 5 in which the olefine is ethylene and vinyl acetate is obtained as a product of the reaction.

7. The process of claim 1 in which the hydrocarbon is an aliphatic alpha-olefine containing at most 12 carbon atoms.

8. The process of claim 3 in which the reaction medium contains carboxylate ions additional to any derived from self-ionization of the carboxylic acid.

9. The process of claim 8 in which the water content of the reaction medium is in the range 5 to 15% by weight.

10. The process of claim 8 in which an organic polar solvent is present.

11. The process of claim 3 in which a redox system is present.

12. The process of claim 11 in which molecular oxygen is present.

13. The process of claim 1 wherein the acid is acetic acid, propionic acid, hexanoic acid, adipic acid, benzoic acid or phthalic acid.

References Cited

UNITED STATES PATENTS 3,221,045    11/1965    McKeon et al. _____ 260—497

FOREIGN PATENTS 1,423,314    11/1965    France _____ 260—497
999,551      7/1965     Great Britain _____ 260—497

JAMES A. PATTEN, Primary Examiner

V. GARNER, Assistant Examiner

U.S. Cl. X.R.

260—410.9, 475, 476, 479, 485, 597, 601, 604, 611, 612, 614, 615